United States Patent
Desberg

(10) Patent No.: US 9,650,101 B2
(45) Date of Patent: May 16, 2017

(54) HANDLEBAR GRIP COVERS

(71) Applicant: RAZOR USA, LLC, Cerritos, CA (US)

(72) Inventor: Ian Desberg, Cerritos, CA (US)

(73) Assignee: RAZOR USA, LLC, Cerritos, CA (US)

( * ) Notice: Subject to any disclaimer, the term of this patent is extended or adjusted under 35 U.S.C. 154(b) by 113 days.

(21) Appl. No.: 14/067,777

(22) Filed: Oct. 30, 2013

(65) Prior Publication Data

US 2015/0114167 A1     Apr. 30, 2015

(51) Int. Cl.
*B62K 21/26*     (2006.01)
*B62J 33/00*     (2006.01)

(52) U.S. Cl.
CPC ............. *B62K 21/26* (2013.01); *B62J 33/00* (2013.01); *Y10T 74/20828* (2015.01)

(58) Field of Classification Search
CPC ........ B62K 21/26; B62K 21/12; B62K 23/00; B62J 33/00; Y10T 74/20828; Y10T 74/20822; Y10T 74/2078
USPC ..... 74/551.8, 551.9, 555, 558.5, 551.1, 557; D12/114; 2/17, 158, 159; 446/26, 327, 446/328, 390
See application file for complete search history.

(56) References Cited

U.S. PATENT DOCUMENTS

| | | | | |
|---|---|---|---|---|
| 568,024 A | * | 9/1896 | Gorman | A41D 13/085 125/40 |
| 571,020 A | * | 11/1896 | Royce | 2/17 |
| 1,983,907 A | * | 12/1934 | Lindner | B62J 33/00 237/12.3 R |
| 2,344,545 A | * | 3/1944 | Harder | B62J 23/00 2/17 |
| 3,462,188 A | * | 8/1969 | Manuel | B62J 23/00 296/78.1 |
| 4,141,567 A | * | 2/1979 | Scott | 280/304.3 |
| D319,992 S | * | 9/1991 | Acerbis | D12/114 |
| 5,740,700 A | * | 4/1998 | Redmond | B62J 23/00 2/17 |
| 6,371,828 B1 | * | 4/2002 | Ngan | 446/450 |
| 2004/0173046 A1 | * | 9/2004 | Hancock et al. | B62J 27/00 74/551.8 |
| 2012/0291588 A1 | * | 11/2012 | Cutino | B62J 23/00 74/551.8 |
| 2015/0329162 A1 | * | 11/2015 | Small, Jr. | B62J 23/00 74/551.8 |

FOREIGN PATENT DOCUMENTS

| | | | | | |
|---|---|---|---|---|---|
| CH | 90827 A | * | 1/1922 | ............. | B62K 21/26 |
| GB | 2113163 A | * | 8/1983 | ............. | B62J 23/00 |

* cited by examiner

*Primary Examiner* — Adam D Rogers
(74) *Attorney, Agent, or Firm* — Knobbe, Martens, Olson & Bear, LLP

(57) ABSTRACT

A vehicle includes a handgrip assembly supported by a handlebar assembly. The handgrip assembly includes handgrip portion that defines an outer grip surface. The handgrip assembly also includes a cover portion coupled to the handgrip portion and partially surrounding the handgrip portion. The cover portion provides an appearance of a hand supported by or grasping the handlebar assembly.

28 Claims, 19 Drawing Sheets

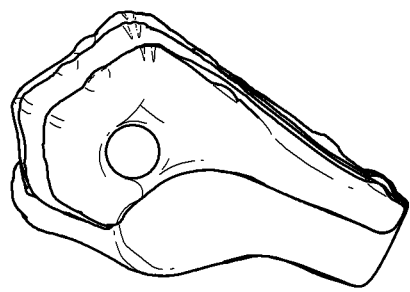 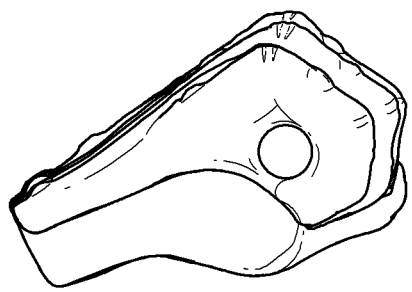
FIG. 16  FIG. 17
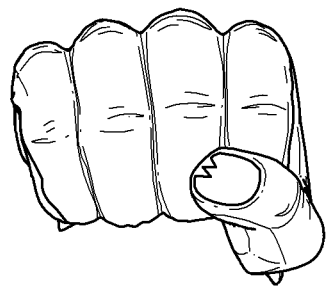 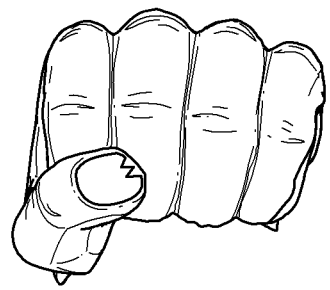
FIG. 18
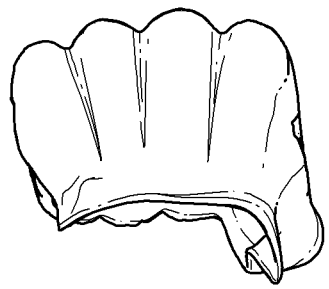 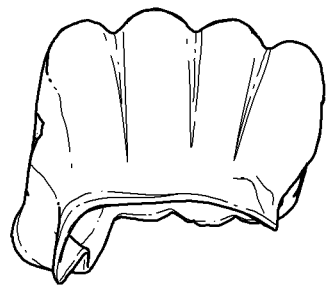
FIG. 19

HANDLEBAR GRIP COVERS

BACKGROUND OF THE DISCLOSURE

Field of the Invention

Embodiments of the invention relate generally to handlebar grips for vehicles and, more specifically, to handlebar grip assemblies for scooters.

Description of the Related Art

Riding on vehicles such as scooters, bicycles and other ridable vehicles is a popular recreational activity. Ridable vehicles have become popular among many age groups and there are different variations and designs. Conventional scooters and ridable vehicles generally have at least two wheels and some type of steering mechanism. Other vehicle designs include three or more wheels. Scooter designs have also become more compact and convenient. With the increase in scooter popularity, there has also been a significant increase in the demand for scooter accessories.

SUMMARY OF THE DISCLOSURE

Often, it is desirable for a vehicle or scooter to have visual features that personalize the scooter. It is also desirable to have covers or other accessories on the handlebars to provide visual effect and/or protection to the user. It is also generally desirable that the covers or handlebar accessories do not interfere with the performance of the vehicle or a user's ability to ride or steer the vehicle. It is also often desirable that a user can easily access the grip portion of a handlebar or steering wheel with the accessories or covers installed on the vehicle. However, some vehicles include covers or handlebar accessories that obstruct a user's access to the handlebar or are detrimental to the user's ability to ride or steer the vehicle properly.

An aspect of the present invention involves the realization that it is desirable to provide a handlebar accessory that covers a user's hand and also allows a user to easily ride or steer the vehicle. It is also desirable to have a hand cover to provide visual effect and a unique aesthetic without negatively affecting a user's ability to ride and steer the vehicle. Therefore, the current arrangements in the prior art for covering a hand on a vehicle are undesirable or unsuitable or can be improved upon.

Preferred embodiments of the present vehicle or scooter include a handgrip assembly that allows a user to grip the handgrip and provides an appearance of a hand or other feature on the handlebar or steering wheel. A user can easily and effectively access the handgrip and steer the vehicle while providing the appearance that a different set of hands are grasping the handlebar or steering wheel. Furthermore, other preferred embodiments provide a cover portion that covers at least a portion of the handgrip and is configured to protect a user's hand. Furthermore, preferred embodiments include a right handgrip assembly and a left handgrip assembly, each having a cover portion that is permanently coupled to the handgrip portion. In other preferred embodiments, the handgrip assemblies include cover portions having various walls that define a space such that the entire handgrip is accessible to a user.

A preferred embodiment is a handgrip assembly comprising a handgrip portion defining an outer grip surface and a cover portion coupled to the handgrip portion. The cover portion provides an appearance of an oversized or alternative hand that is not the hand of the user gripping a portion of a vehicle handlebar assembly on which the hand grip assembly is mounted.

Another preferred embodiment is a vehicle, comprising a vehicle body and a handlebar assembly coupled to the vehicle body. The handlebar assembly includes a right handlebar portion and a left handlebar portion. A right handgrip assembly is positioned on the right handlebar portion and a left handgrip assembly is positioned on the left handlebar portion. Each of the right and left handgrip assemblies comprise a handgrip portion defining an outer grip surface sized and shaped to be grasped by a user of the vehicle. Each of the right and left handgrip assemblies also comprise a cover portion permanently coupled and rotationally fixed to the handgrip portion. The cover portion includes at least a front wall, a top wall and an inner sidewall. The inner sidewall extends in a radial direction from the handgrip portion and at least partially supports the cover portion relative to the handgrip portion. The front wall and the top wall are spaced from the outer surface of the handgrip portion such that an entirety or a substantial entirety of the outer grip surface is accessible to a user of the vehicle. The cover portion provides an appearance of an oversized hand gripping a respective one of the right handlebar portion and the left handlebar portion.

In some configurations, the handgrip portion and the cover portion are unitary.

In some embodiments, the cover portion further comprises an outer sidewall and the handgrip portion comprises a hole that extends through the inner sidewall and the outer sidewall. In some embodiments, the top portion has a length and the cover portion further comprises a bottom wall having a length, and the length of the bottom portion is less than one third of the length of the top wall.

In some configurations, the outer sidewall includes an edge that extends from a position adjacent the front wall and the bottom wall to a position adjacent the rear-most portion of the top wall.

In some configurations, the outer sidewall has a smaller surface area than the surface area of the inner sidewall.

In some configurations, the outer sidewall, inner sidewall, bottom wall and top wall define an opening for receiving the hand of a user, the opening having a shape and the cover portion being rigid enough to maintain the shape of the opening absent any abnormal external forces.

In some configurations, the opening has a vertical dimension and the grip portion has a diameter, and the vertical dimension of the opening is two or three times greater than the diameter of the grip portion.

In some configurations, the handgrip portion includes a first end and a second end, and the first end and second end are fixedly coupled to and in contact with the cover portion.

An embodiment involves a set of handgrip assemblies comprising a right handgrip assembly and a left handgrip assembly. Each of the right handgrip assembly and the left handgrip assembly includes a handgrip portion defining an outer grip surface sized and shaped to be grasped by a user. Each of the handgrip assemblies also includes a cover portion permanently coupled and rotationally fixed to the handgrip portion. The cover portion includes a front wall, a top wall and an inner sidewall. The inner sidewall extends in a radial direction from the handgrip portion and at least partially supports the cover portion relative to the handgrip portion. The front wall and the top wall are spaced from the outer surface of the handgrip portion such that an entirety of the outer grip surface is accessible to a user of the vehicle. The cover portion provides an appearance of an oversized hand gripping a respective one of a right handlebar portion and a left handlebar portion of a vehicle handlebar on which the set of hand grip assemblies is mounted.

In some configurations, the handgrip portion and the cover portion are a single unitary piece.

In some configurations, the cover portion further comprises an outer sidewall and the handgrip portion comprises a void that extends through the inner sidewall and the outer sidewall, the void being configured to receive a portion of a handlebar.

In some configurations, the top portion has a length and the cover portion further comprises a bottom wall having a length, and the length of the bottom portion is less than one third the length of the top wall.

In some configurations, the outer sidewall includes an edge that extends from a position adjacent the front wall and the bottom wall to a position adjacent the rear-most portion of the top wall. In some configurations, the outer sidewall has a smaller surface area than the inner sidewall.

In some configurations, the outer sidewall, inner sidewall, bottom wall and top wall define an opening for receiving the hand of a user, the opening having a permanent shape and the cover portion being rigid enough to maintain the shape of the opening.

In some configurations, the opening has a vertical dimension and the grip portion has a diameter, and the vertical dimension of the opening is more than two times greater than the diameter of the grip portion.

In some configurations, the handgrip portion includes a first end and a second end, and the first end and second end are in direct contact with the cover portion.

BRIEF DESCRIPTION OF THE DRAWINGS

These and other features, aspects, and advantages of the present invention are described below with reference to drawings of preferred embodiments, which is intended to illustrate, but not to limit, the present invention. The drawings contain 30 figures.

FIG. 16 illustrates a left side view of the set of handgrip assemblies of FIG. 12.

FIG. 17 illustrates a right side view of the set of handgrip assemblies of FIG. 12.

FIG. 18 illustrates a front view of the set of handgrip assemblies of FIG. 12.

FIG. 19 illustrates a rear view of the set of handgrip assemblies of FIG. 12.

DETAILED DESCRIPTION OF THE PREFERRED EMBODIMENTS

In the following detailed description, terms of orientation such as "top", "bottom", "upward", "downward", "lower", "front", "frontward", "rear", "rearward", and "end" are used to simplify the description of the context of the illustrated embodiments. Likewise, terms of sequence, such as "first" and "second", are used to simplify the description of the illustrated embodiments. However, other orientation and sequences are possible, and embodiments of the present invention should not be limited to the illustrated orientation(s). Those skilled in the art will appreciate that other orientations of the various components are possible.

For the purposes of this disclosure, embodiments of personal mobility vehicles will be referred to as "scooters", but it will be understood by those with ordinary skill in the art that the present invention extends beyond the specifically disclosed embodiments and references to scooters to other alternative embodiments and/or uses of the invention and modifications and equivalents thereof. In particular, while the present vehicles and related methods have been described in the context of particularly preferred embodiments as it relates to scooters, the skilled artisan will appreciate, in view of the present disclosure, that certain advantages, features and aspects of the systems and methods may be realized in a variety of other applications, including personal mobility vehicles other than scooters with different arrangements of front and rear wheels.

In a preferred embodiment, a scooter includes a body having a deck and a footrest portion. The body supports a handlebar assembly that is configured to be accessible to a user riding the scooter. Preferably, the handlebar assembly includes a set of handgrip assemblies. Each handgrip assembly includes a handgrip portion configured to be grasped by a user and a cover portion that covers at least a portion of a user's hand when the user is grasping the handgrip portion. Preferably, the cover portion gives the appearance of an oversized hand or other feature grasping the handlebar assembly.

Figure 1:
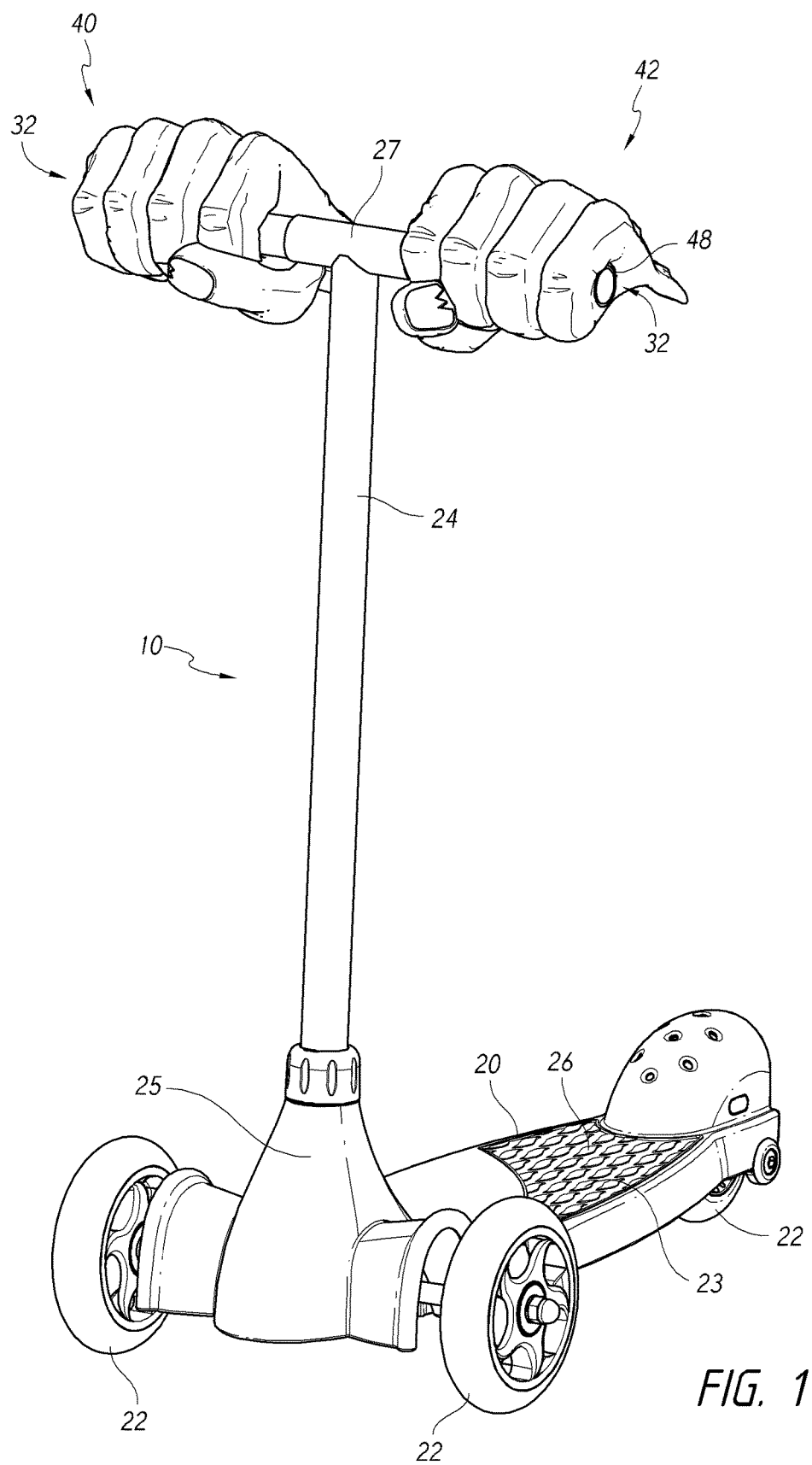
FIG. 1 is a perspective view of an embodiment of a scooter having certain features, aspects, and advantages of the present invention.

FIG. 1 illustrates a scooter 10 having certain features, aspects and advantages of the present invention. The scooter 10 includes a body 20, which includes a deck 26 and a handlebar assembly 24. Preferably, the upper surface of the deck 26 includes a foot rest surface 23 which is configured to support a foot or the feet of a user. The scooter 10 includes one or more wheels 22 supported by the body 20. The illustrated scooter includes wheels 22 spaced apart from one another with the deck 26 extending therebetween, such as a pair of front wheels spaced laterally from one another and at least one rear wheel spaced longitudinally from the front wheels. However, other numbers and arrangements of wheels can be provided, including but not limited to a single front wheel and a single rear wheel.

As illustrated, a preferred embodiment of the scooter 10 also includes a support portion 25 which supports the handlebar assembly 24 so that the handlebar assembly 24 extends upward from the deck 26. Preferably, a handlebar 27 is positioned at or near the top of the handlebar assembly 24. In one embodiment, the scooter 10 also includes a set of handgrip assemblies supported by the handlebar 27. Embodiments of the scooter and handgrip assemblies are described below with reference to FIGS. 1 through 5. Preferably the set of handgrip assemblies includes a right handgrip assembly and a left handgrip assembly. In some embodiments, the right handgrip assembly is not interchangeable with the left handgrip assembly, and each handgrip assembly is configured to receive or be grasped by either the right or the left hand of a user. Preferably, each of the handgrip assemblies includes a cover portion that provides an appearance of a feature such as a hand or similar visual feature supported by the vehicle. Each of the right and left handgrip assemblies can include a handgrip portion with an outer grip surface sized and shaped to be grasped by a user of the vehicle. In some embodiments, each handgrip assembly includes a cover portion that is coupled to the handgrip portion and includes a front wall, a top wall and an inner sidewall. Preferably, the cover portion includes various walls that are spaced from the outer surface of the handgrip portion and define an open space through which a user can access the outer grip surface.

For purposes of this disclosure and relating to the appearance provided by the handgrip assemblies or cover portions, the term "hand" includes the human hand and similar hand-like appendages or features. It also includes hand-like features of other animals or things that correspond to the hand. For example, it includes, but is not limited to, hands and also corresponding appendages of animals, aliens, robots, giants, superheroes, monsters, zombies and other characters, which include paws, claws, robotic grasping parts, hoofs, mitts and similar grasping features or appendages.

Figure 2:
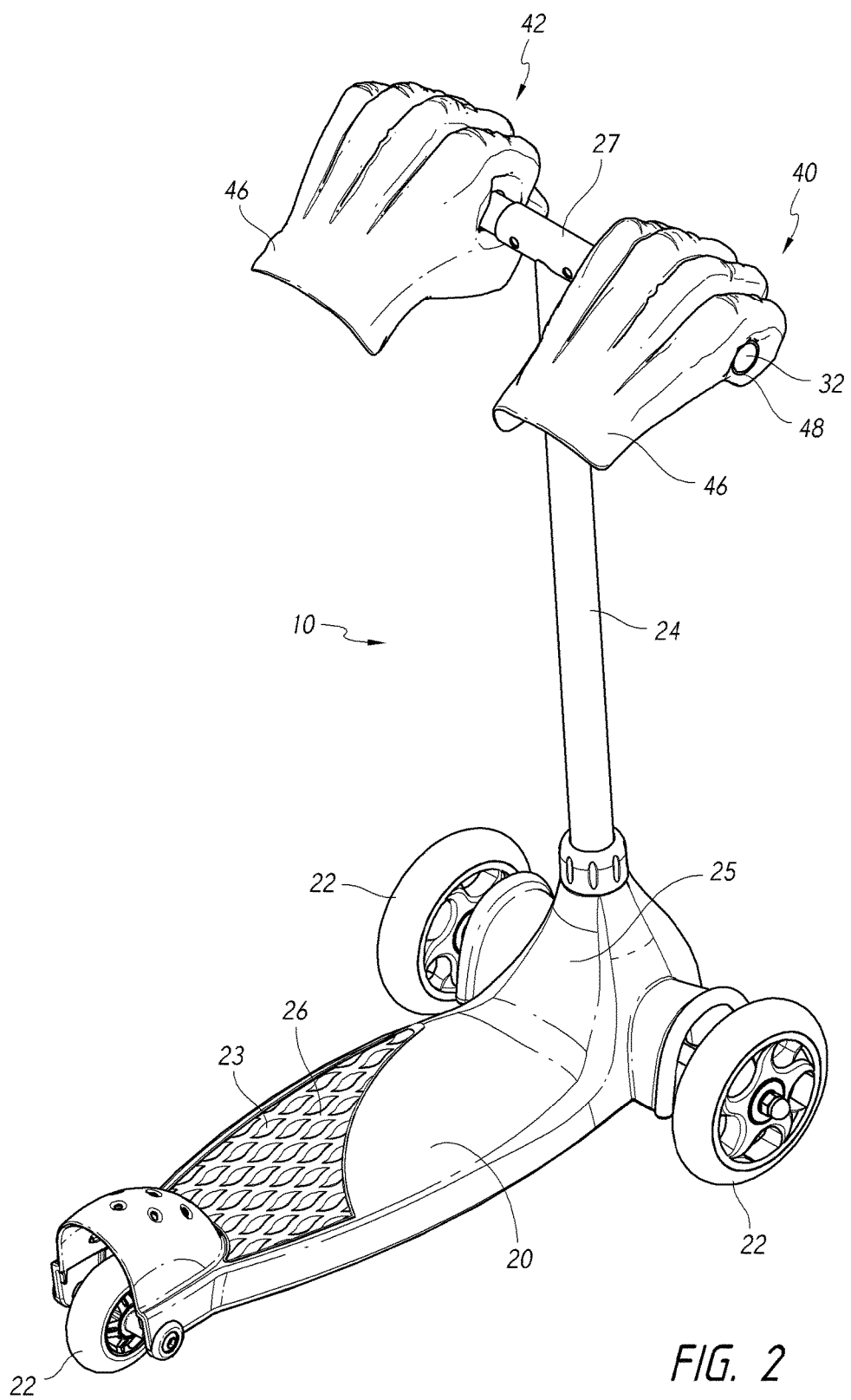
FIG. 2 is another different perspective view of the scooter of FIG. 1.

As described, FIGS. 1 and 2 illustrate a preferred embodiment of the scooter 10 that includes the body 20, deck 26 and handlebar assembly 24. Preferably, the handlebar assembly 24 is configured to allow a rider to steer the scooter 10 by steering at least one of the wheels 22. However, the scooter 10 can have any suitable steering mechanism, such as the steering mechanism disclosed in U.S. Pat. No. 8,186,693 to Korschot, the entirety of which is hereby incorporated by reference herein. Alternatively, the steering mechanism can include one or more front wheels that are rotatable about a steering axis and controllable by the handlebar assembly 24. In some embodiments, the scooter could be a two-wheeled kick scooter, such as the scooter disclosed in U.S. Pat. No. 8,474,840 to Tsai, the entirety of which is hereby incorporated by reference herein. In other embodiments, the scooter can be an electric scooter or bicycle. Other embodiments include a tricycle, kart or any other handlebar-steered vehicle. Some embodiments also include vehicles steered by steering wheels, karts and toys. Alternatively, in some embodiments, the handgrip assembly embodiments described herein can be supported by other toys or objects with bar-type grips or handlebars, for example a pogo stick.

In one embodiment, the handlebar assembly 24 includes a handlebar 27 with two grip portions 32 adjacent each end of the handlebar 27. The scooter 10 also includes a set of handgrip assemblies 40 and 42. The right handgrip assembly 40 is preferably supported by the right handlebar portion 32 and the left handgrip assembly 42 is preferably supported by the left handlebar portion 32. In some embodiments, each of the right and left handgrip assemblies 40 and 42 is removably supported by the handlebar 27. Preferably, each of the handgrip assemblies 40 and 42 includes a handgrip portion 44 that defines an outer grip surface 45 that is sized and shaped to be grasped by a user riding the vehicle. Preferably, the handgrip portion 44 is substantially cylindrical and has a similar shape as the handlebar portion 32. Preferably, a user can grasp the handgrip portion 44 around the entire circumference of the outer grip surface 45. In some embodiments, the handgrip portion 44 includes a hole or opening 48 that extends through the handgrip portion 44. Preferably, the hole or opening 48 is sized and shaped to receive a handlebar portion 32 so that the handlebar portion 32 extends through a portion of the opening 48. The handgrip assemblies 40 and 42 can be fixedly secured on the handlebar portions 32 such that the handgrip portion 44 does not move relative to the handlebar portion 32.

In some embodiments, each handgrip assembly 40 also includes a cover portion 46 that is preferably coupled to the handgrip portion 44. The cover portion 46 can be integrated with the handgrip portion 44. Preferably, the cover portion 46 is permanently coupled to the handgrip portion 44, and the cover portion 46 and the handgrip portion 44 cannot move or rotate relative to one another. Thus, the cover portion 46 and handgrip portion 44 can be securely coupled to the handlebar portion 32 such that neither moves relative to the handlebar portion 32. In some embodiments, the cover portion 46 and the handgrip portion 44 are a single unitary piece or member. Each handgrip assembly that comprises the cover portion 46 and the handgrip portion 44 can be formed by a molding process that creates the assembly as a single unitary piece. A unitary handgrip assembly provides easier and more efficient manufacturing and can also improve the durability of the assembly. Similarly, a cover portion 46 that is permanently coupled and fixed relative to the handgrip portion 44 also provides strength and durability to the handgrip assembly. Preferably, the cover portion 46 and handgrip portion 44 are not collapsible or separable, as to provide additional strength and durability.

Preferably, the cover portion 46 includes multiple walls or wall portions that define a space accessible to the hand of a user. As described herein, the walls can be wall portions of the same wall or structure. For example, a portion of the cover portion 46 called a top wall contemplates a wall portion that is only a portion of a larger wall or structure that may also include other wall portions such as a sidewall or bottom wall. In some embodiments, the cover portion 46 comprises a continuous wall or wall portion that includes various walls or wall portions, for example, front, bottom, side and top. In some embodiments, the cover portion 46 is configured to have the appearance of a hand or a hand-like member grasping or supported by the handlebar 27. The cover portion 46 preferably resembles an oversized hand grasping the handlebar 27 where a user would be grasping the handlebar when riding the scooter. For example, the cover portion 46 can resemble the oversized hand of a zombie or a monster and can give the appearance that a zombie or monster is grasping the handlebar. Preferably, the cover portion 46 covers a portion of the user's hand when he or she is gripping the handgrip portion 44, and it appears that the oversized hand is gripping the handlebar instead of the user's.

Figure 3:
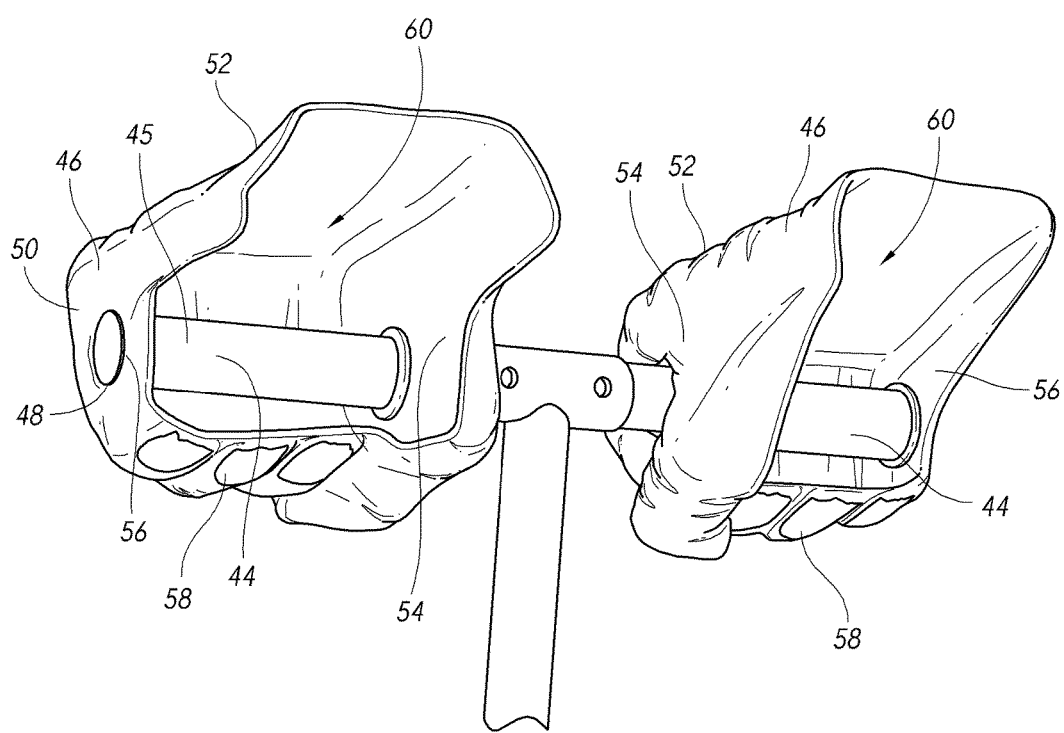
FIG. 3 is a perspective view of a set of handgrip assemblies of the scooter of FIG. 1.
Figure 4:
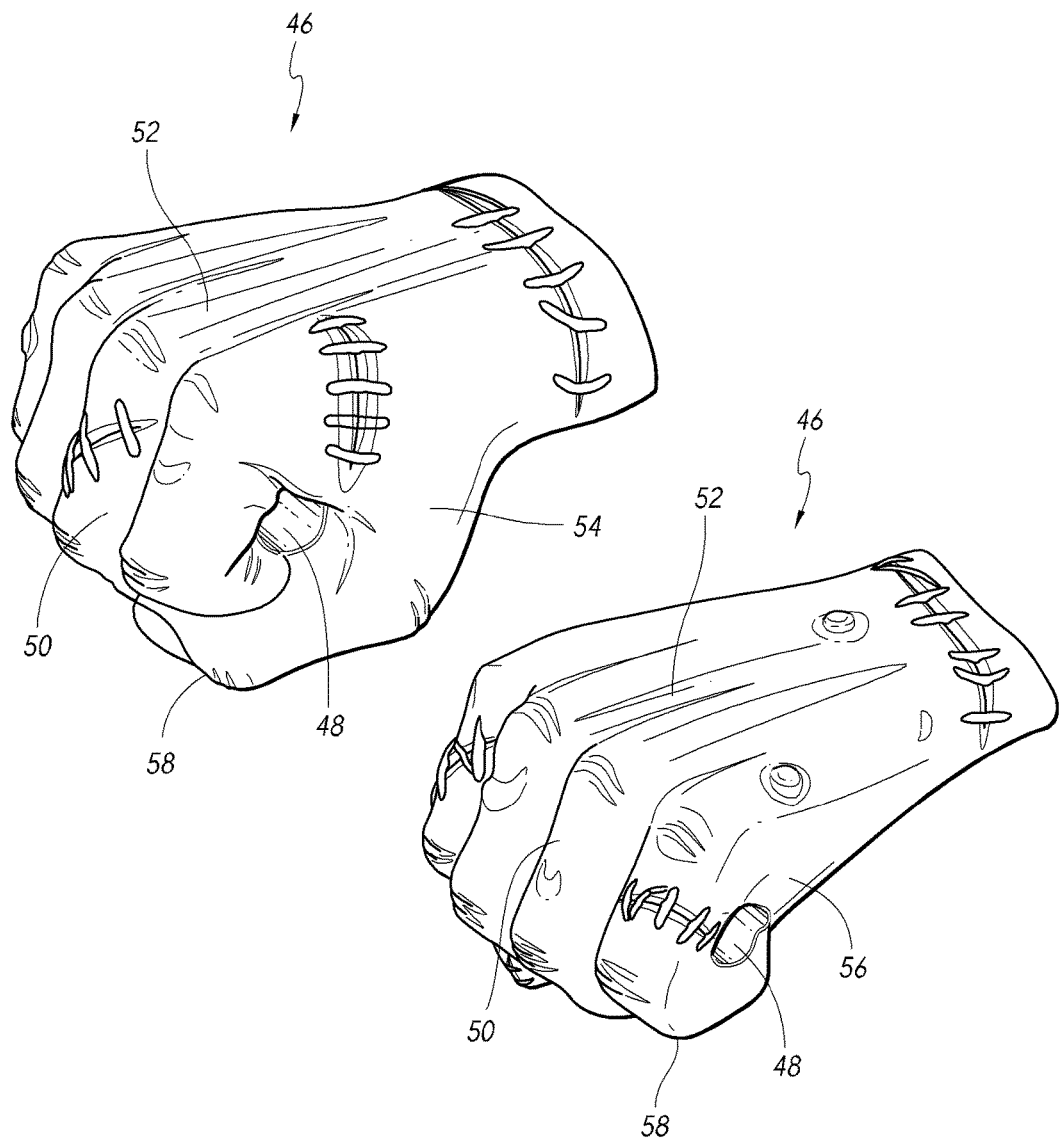
FIG. 4 illustrates a perspective view of another embodiment of handgrip assemblies.
Figure 5:
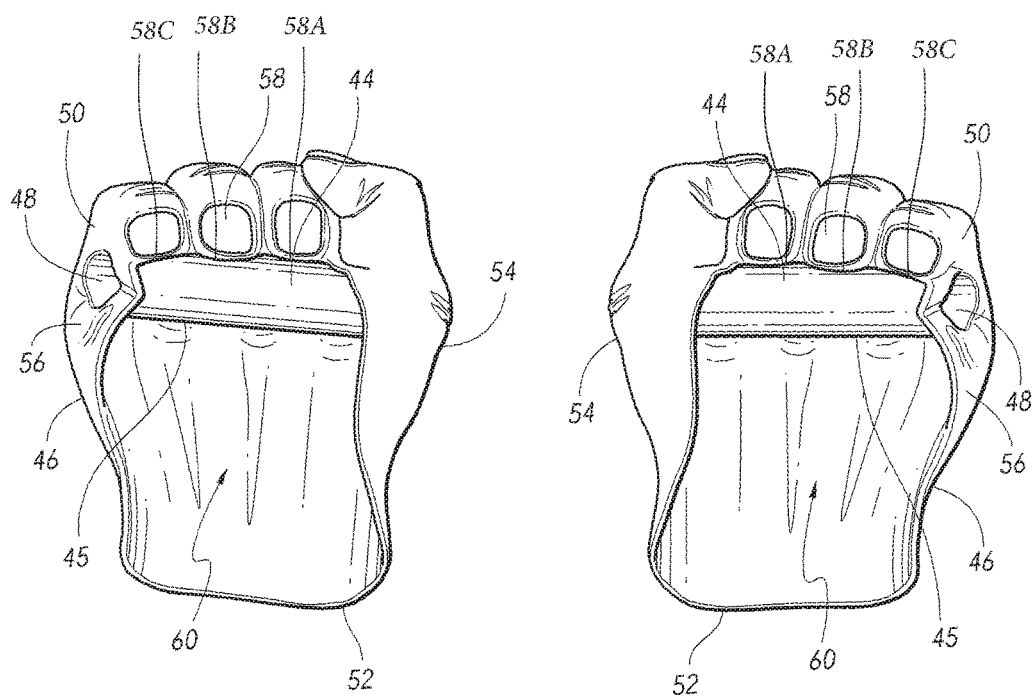
FIG. 5 illustrates another different perspective view of the handgrip assemblies of FIG. 4.
Figure 6:
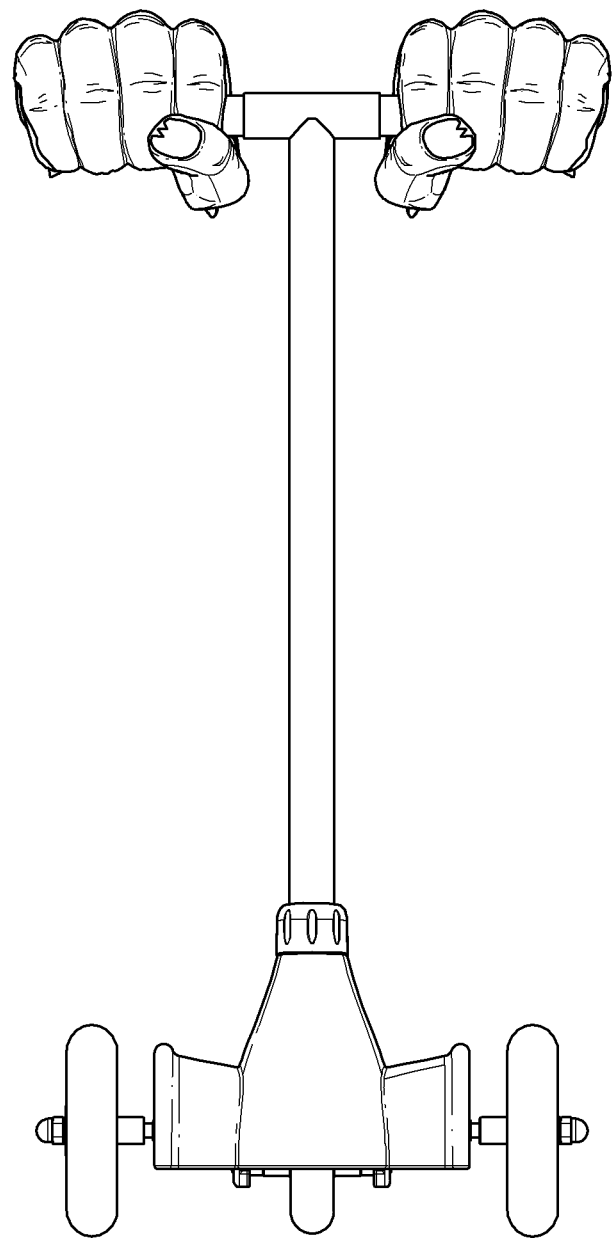
FIG. 6 illustrates a front view of the scooter of FIG. 1.
Figure 7:
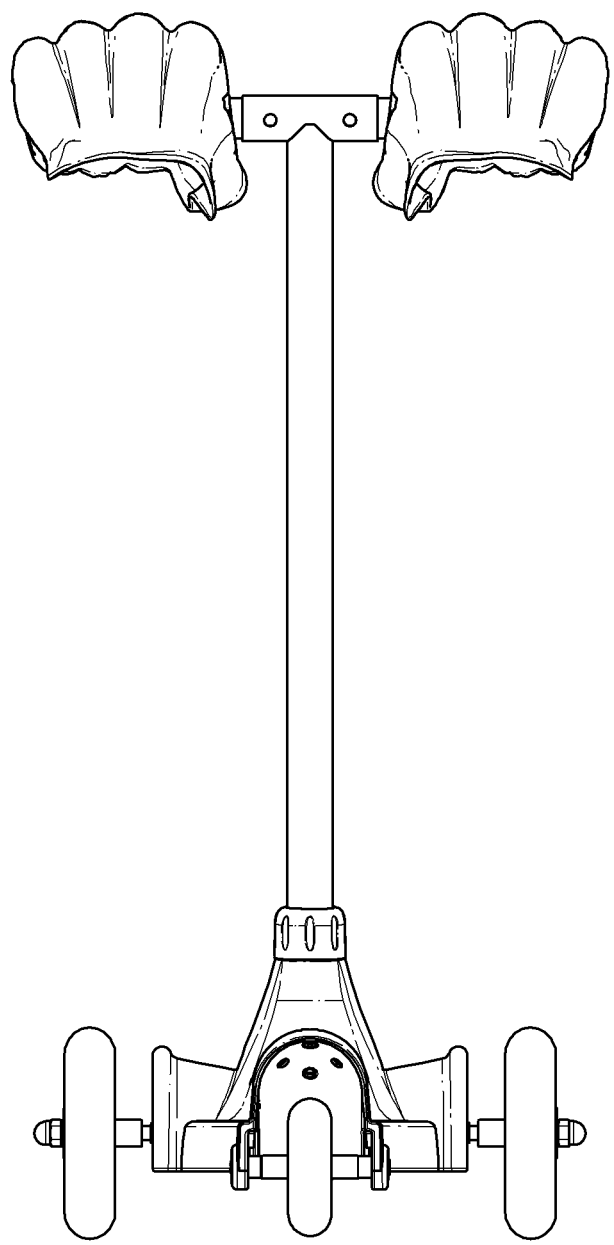
FIG. 7 illustrates a rear view of the scooter of FIG. 1.
Figure 8:
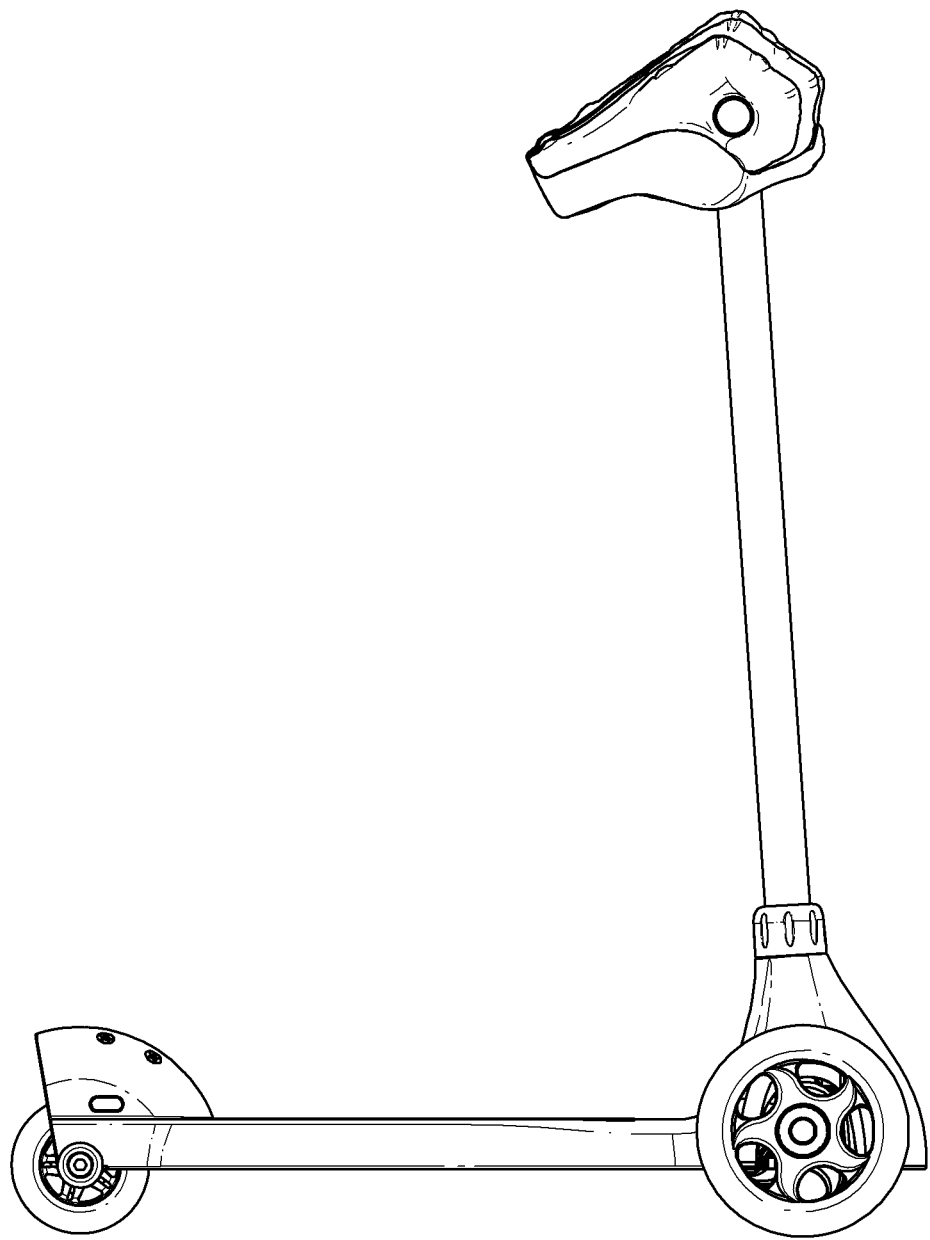
FIG. 8 illustrates a right side view of the scooter of FIG. 1.
Figure 9:
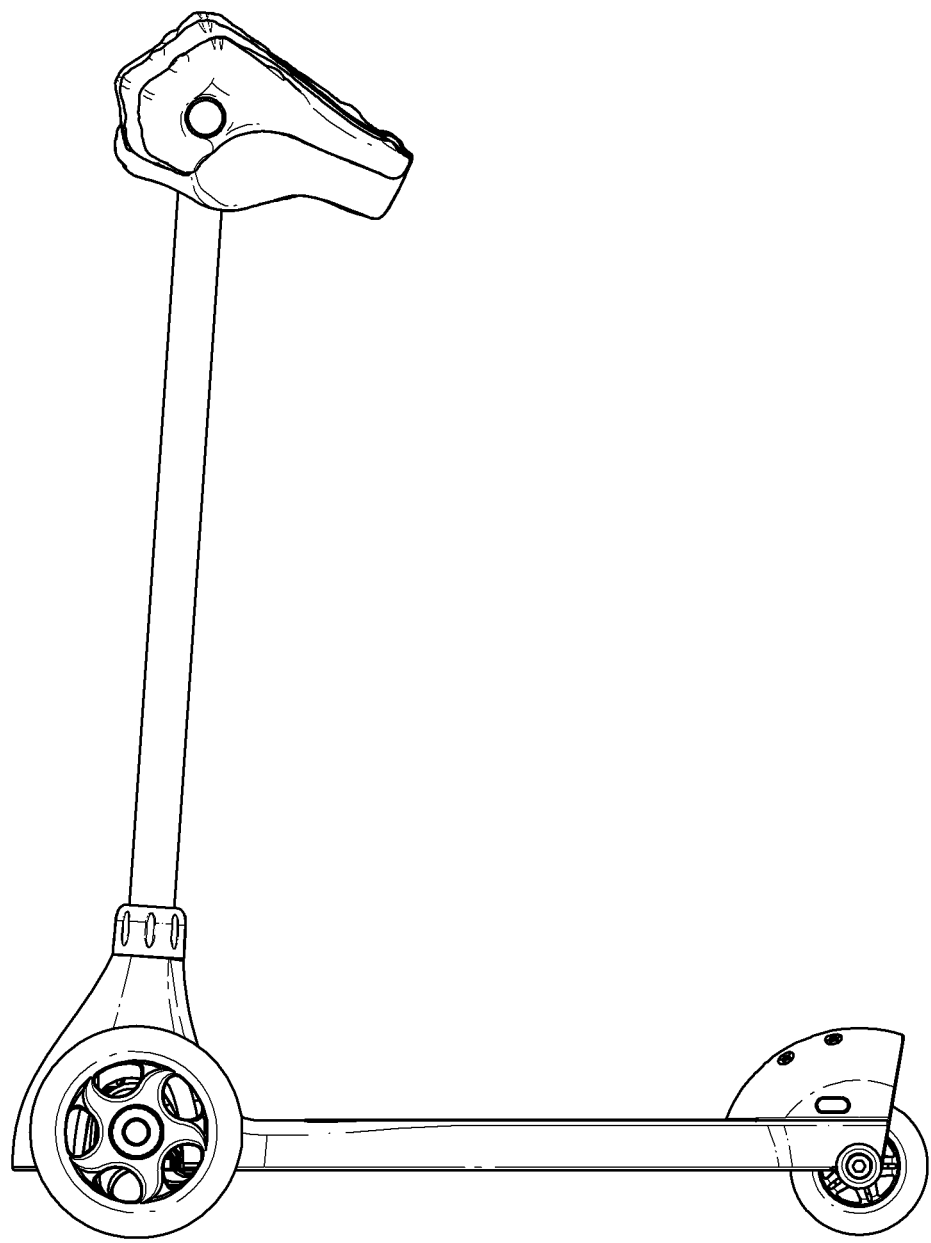
FIG. 9 illustrates a left side view of the scooter of FIG. 1.
Figure 10:
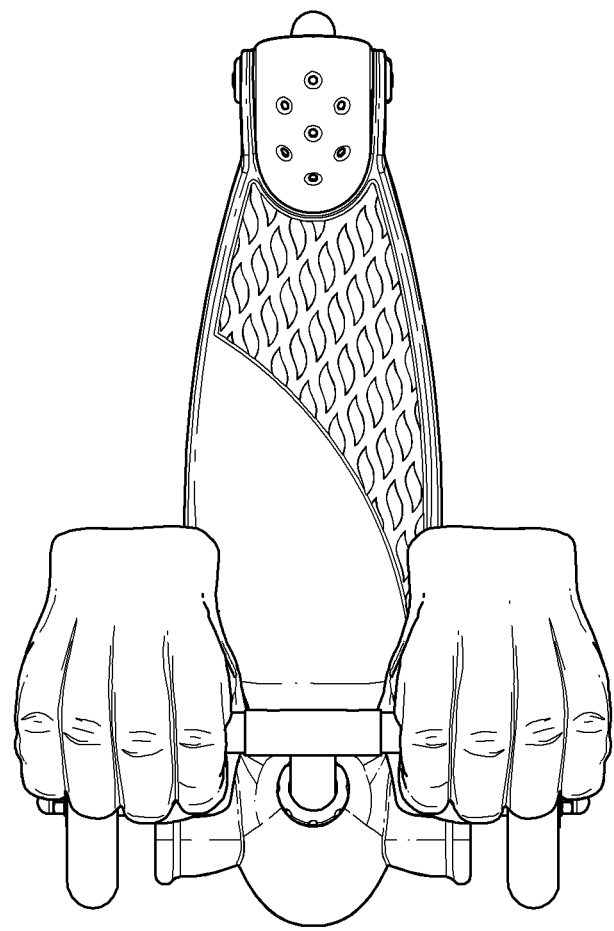
FIG. 10 illustrates a top view of the scooter of FIG. 1.
Figure 11:
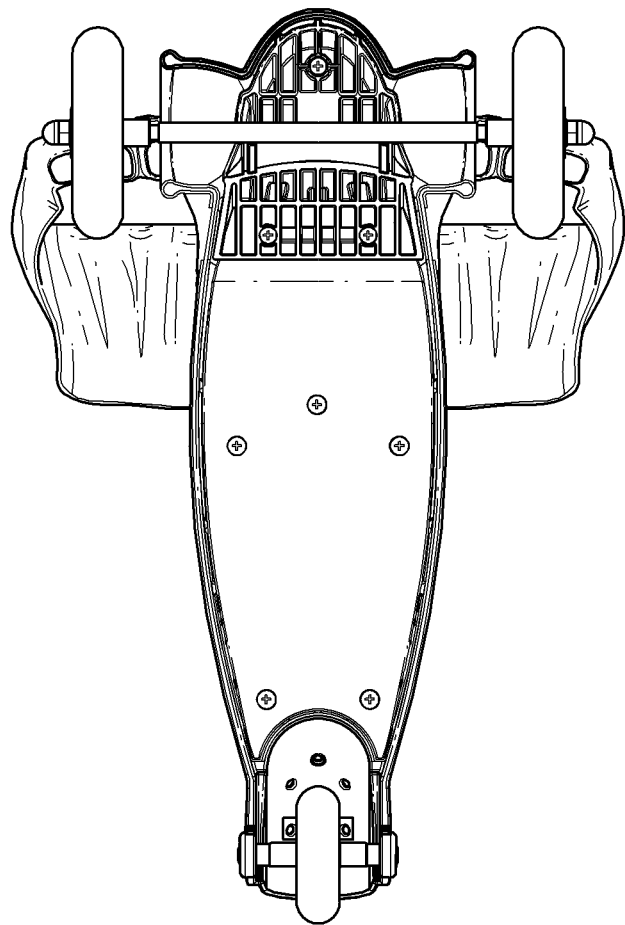
FIG. 11 illustrates a bottom view of the scooter of FIG. 1.
Figure 12:
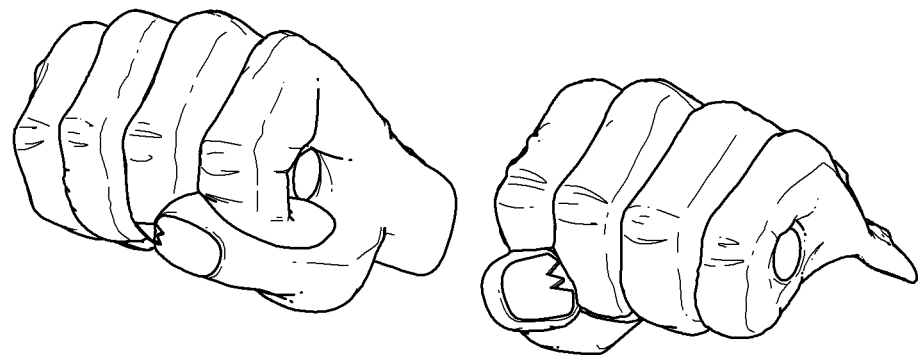
FIG. 12 is a perspective view of an embodiment of a set of handgrip assemblies.
Figure 13:
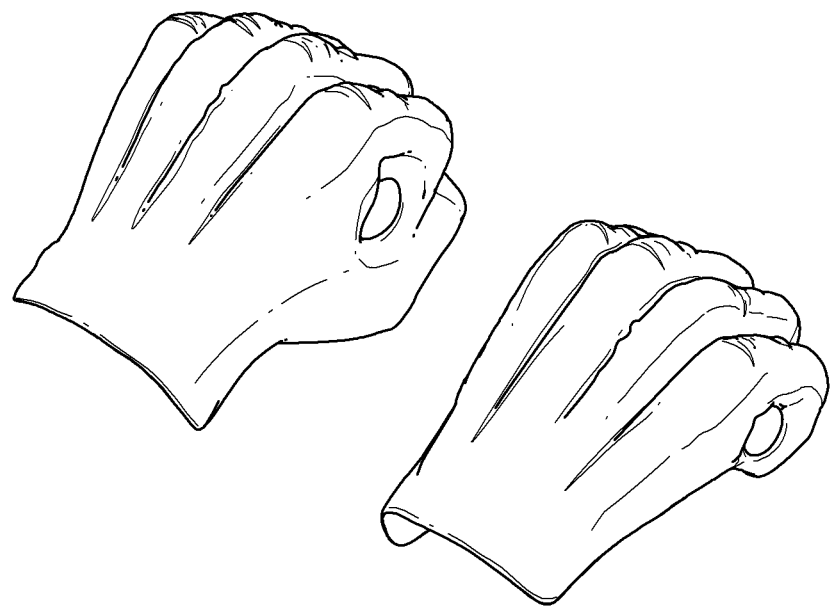
FIG. 13 illustrates another different perspective view of the set of handgrip assemblies of FIG. 12.
Figure 14:
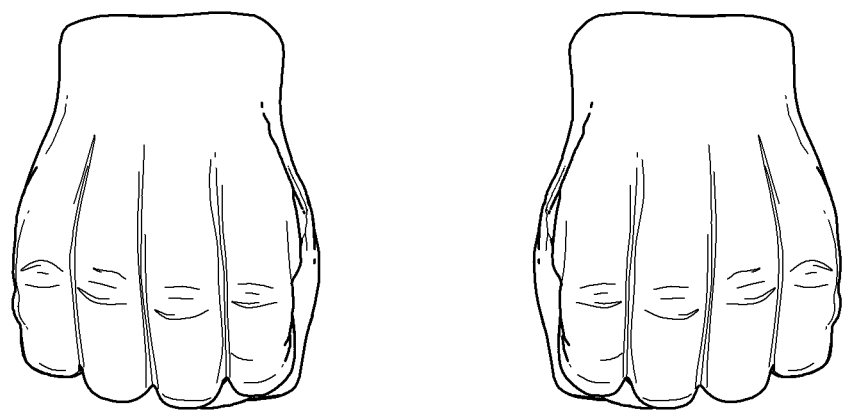
FIG. 14 illustrates a top view of the set of handgrip assemblies of FIG. 12.
Figure 15:
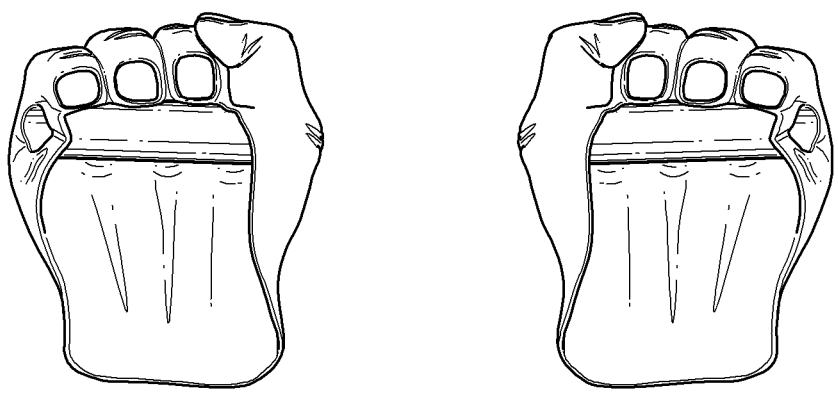
FIG. 15 illustrates a bottom view of the set of handgrip assemblies of FIG. 12.
Figure 20:
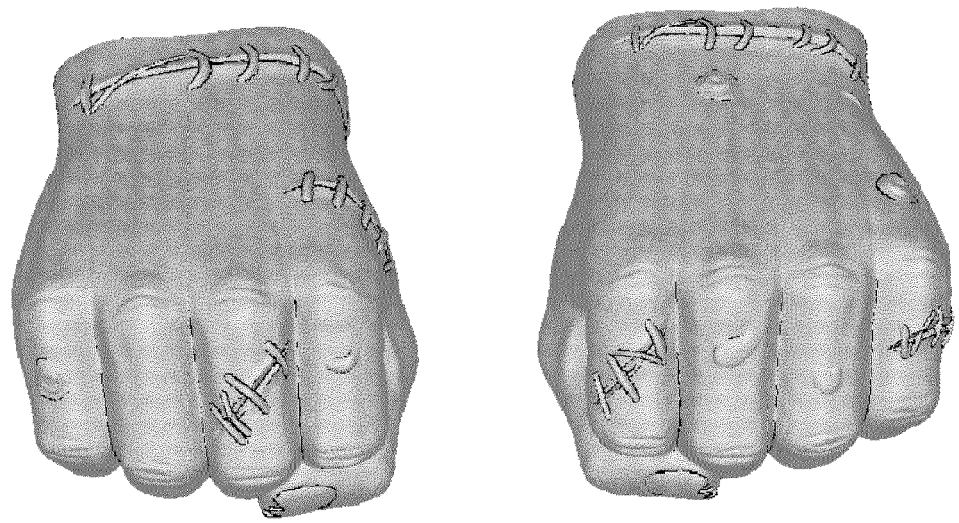
FIG. 20 is a perspective view of another different embodiment of a set of handgrip assemblies.
Figure 21:
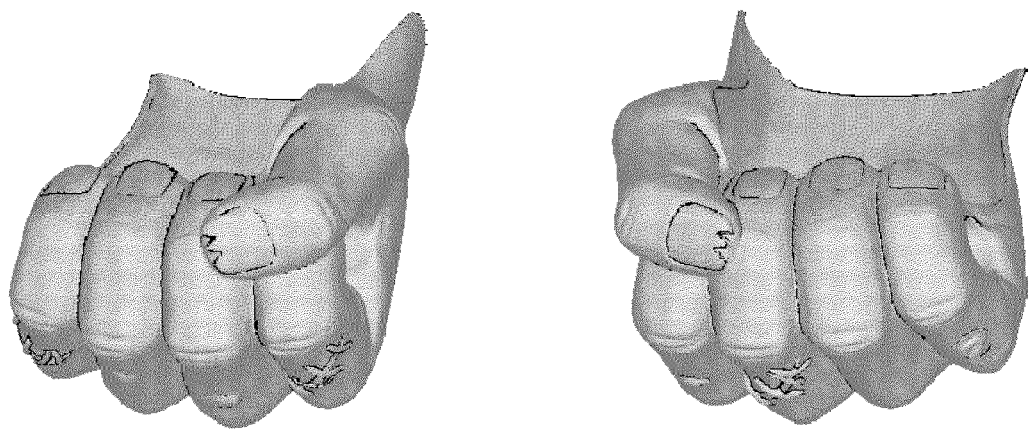
FIG. 21 illustrates another different perspective view of the set of handgrip assemblies of FIG. 20.
Figure 22:
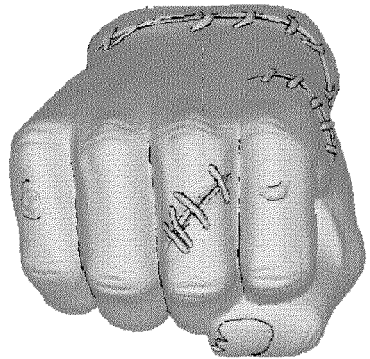
FIG. 22 illustrates a front view of the set of handgrip assemblies of FIG. 20.
Figure 22:
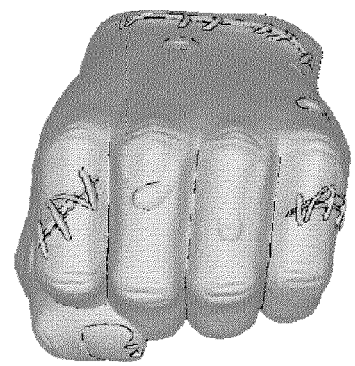
Figure 23:
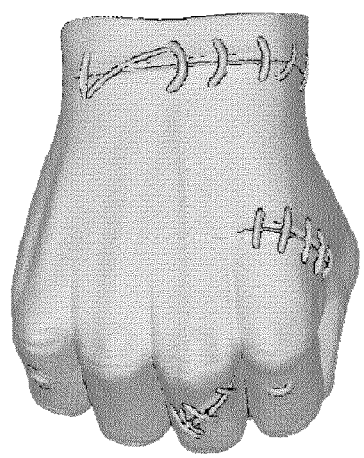
FIG. 23 illustrates a top view of the set of handgrip assemblies of FIG. 20.
Figure 23:
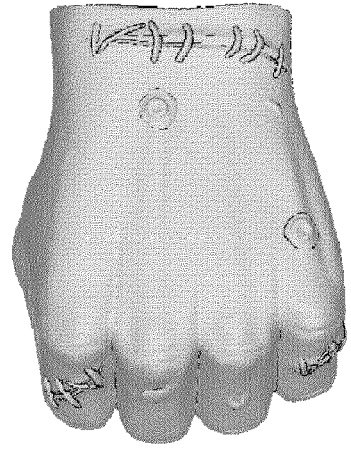
Figure 24:
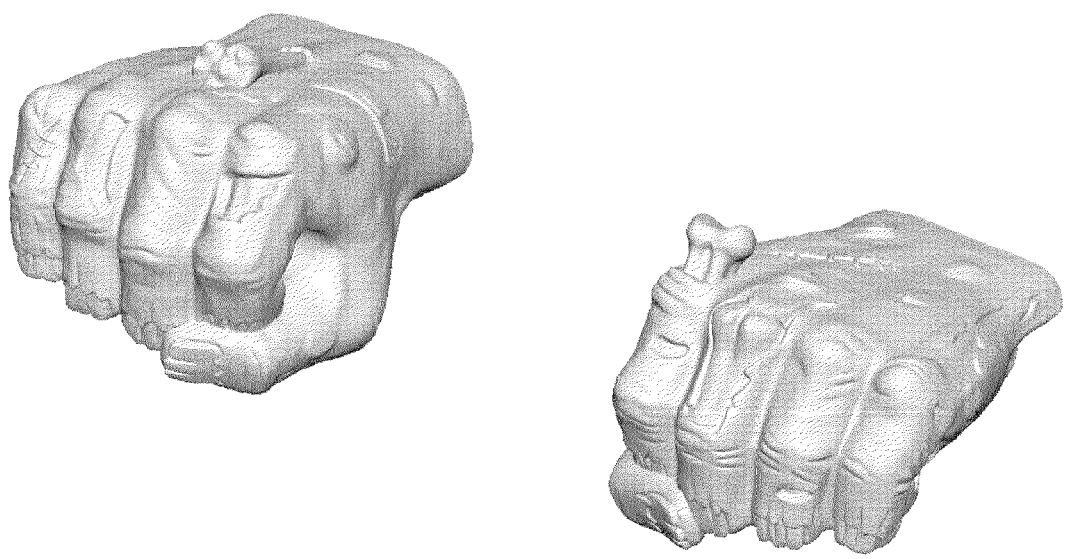
FIG. 24 is a perspective view of another different embodiment of a set of handgrip assemblies.
Figure 25:
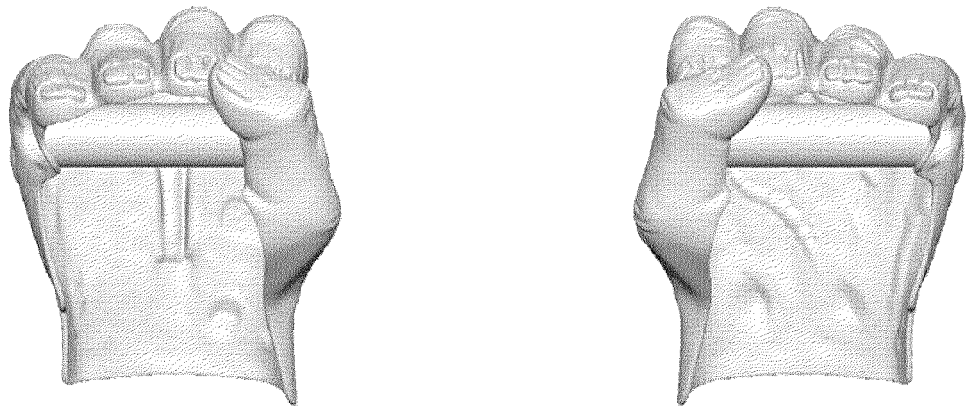
FIG. 25 illustrates a bottom view of the set of handgrip assemblies of FIG. 24.
Figure 26:
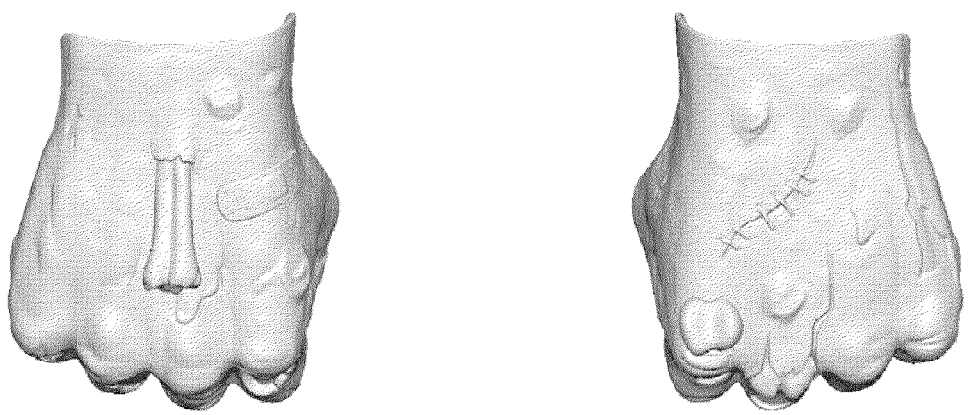
FIG. 26 illustrates a top view of the set of handgrip assemblies of FIG. 24.
Figure 27:
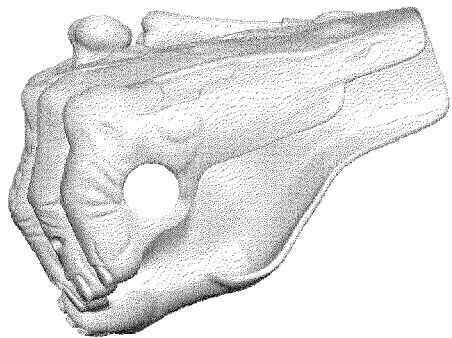
FIG. 27 illustrates a left side view of the set of handgrip assemblies of FIG. 24.
Figure 28:
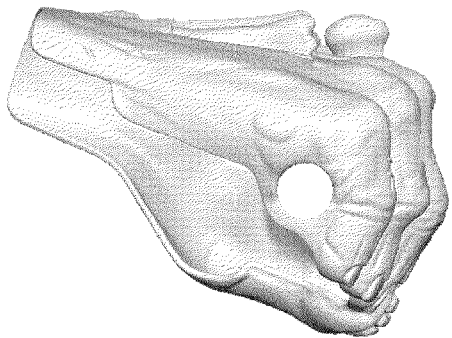
FIG. 28 illustrates a right side view of the set of handgrip assemblies of FIG. 24.
Figure 29:
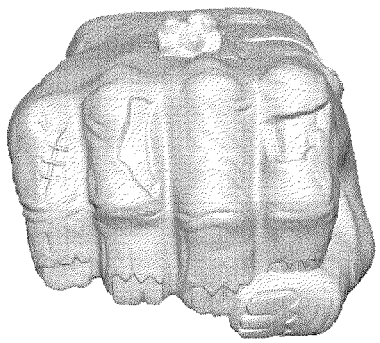
FIG. 29 illustrates a front view of the set of handgrip assemblies of FIG. 24.
Figure 29:
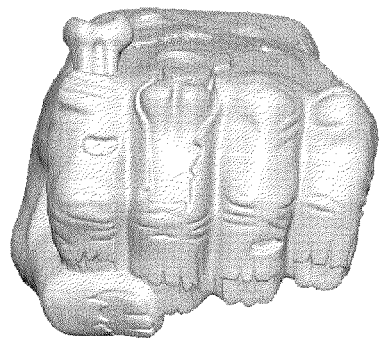
Figure 30:
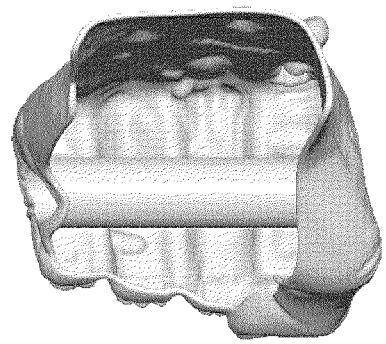
FIG. 30 illustrates a rear view of the set of handgrip assemblies of FIG. 24.
Figure 30:
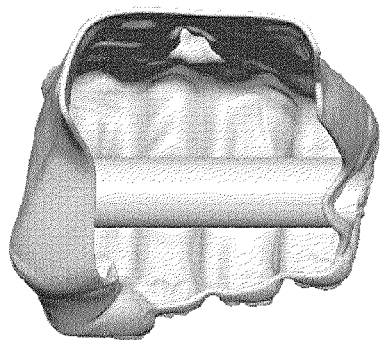

As illustrated in FIGS. 3 through 5, in some preferred embodiments, the cover portion 46 includes a front wall or wall portion 50, a top wall or wall portion 52 and an inner sidewall or wall portion 54. Preferably, the front wall 50 is positioned in front of the handgrip portion 44 and the top wall 52 extends above the handgrip portion 44. As illustrated, the inner sidewall 54 extends in a radial or outward direction from the handgrip portion 44 and at least partially supports the cover portion 46 relative to the handgrip portion 44. The inner sidewall 54 can extend from the handgrip portion 44 to the top wall 52. Preferably, the top wall 52 extends from the front wall 50 backward toward a user riding the scooter, and is spaced from the outer grip surface 45 of the handgrip portion 44. The front wall 50 is also spaced from the outer surface 45 of the handgrip portion 44 so that a user can access the entire outer grip surface 45. In some embodiments, the cover portion 46 also includes an outer sidewall or wall portion 56. As illustrated, the outer sidewall 56 extends in a radial or outward direction from the handgrip portion 44 and can at least partially support the cover portion 46 relative to the handgrip portion 44. The outer sidewall 56 can extend from the handgrip portion 44 to the top wall 52. In some embodiments, the hole or opening 48 extends through the inner sidewall 54 and the outer sidewall 56. Preferably, the handgrip portion 44 also includes a first end and a second end, and each of the first end and second ends is coupled to and in contact with the cover portion 46. One end of the handgrip portion 44 can be coupled to the inner sidewall 54 and the other end to the outer sidewall 56.

The cover portion 46 can also include a bottom wall or wall portion 58. Preferably, the bottom wall 58 extends from the front wall 50 backward toward the user on the scooter. The cover portion 46 can include a plurality of fingertips. For example, the bottom wall 58 of the cover portion 46 can include a first fingertip 58A, a second fingertip 58B, and/or a third fingertip 58C. The bottom wall 58 can also be coupled to the inner sidewall 54 and the outer sidewall 56. The bottom wall 58 has a length extending from the front wall 50 backward toward the user. Preferably, the length of the bottom wall 58 is less than half of the length of the top wall 52 extending from the front wall 50 backward toward the user. In other embodiments, the length of the bottom wall 58 is less than one third the length of the top wall 52. Preferably, the bottom wall 58 does not extend past the trailing edge of the handgrip portion 44. As illustrated, the outer sidewall 56 includes an edge that extends in a substantially diagonal direction relative to the other walls. Preferably, the edge of the outer sidewall 56 extends from a position near the front wall 50 to a position near the rear-most portion of the top wall 52. In some embodiments, the outer sidewall 56 is substantially triangular in shape. Preferably, the outer sidewall 56 has a smaller surface area than the surface area of the inner sidewall 54. In some embodiments, the surface area of the outer sidewall 56 is less than two thirds the size of the surface area of the inner sidewall 54, and in other embodiments it is less than half the size. As illustrated, the bottom wall 58 preferably includes a thumb portion that extends below the thumb area of the handgrip portion 44 or cover portion 46. Each of the walls or wall portions could be generally planar with clear transitions therebetween, or the walls could be more complex in shape such that transitions and walls or wall portions are not clearly distinct. For example, the cover portion 46 could be more spherical or hemi-spherical such that it is less clearly where each wall or wall portion ends and another begins.

As illustrated, the outer sidewall 56, inner sidewall 54, bottom wall 58 and top wall 52 define an opening 60 that is large enough to receive the hand of a user. The opening 60 has a vertical dimension that is preferably two to three times greater than the diameter of the outer grip surface 45 or grip portion 44, and in other embodiments it is three or more times greater than the diameter of the outer grip surface 45. In some embodiments, the opening 60 is large enough that a user can move his or her wrist vertically within the opening 60. The opening 60 can also be large enough so that a user can move his or her wrist from side to side within the opening 60. Preferably, the cover portion 46 is made from a material that is rigid enough to maintain the shape of the opening 60 under normal riding conditions. Absent any abnormal or unexpected outside forces, the cover portion 46 is preferably rigid enough to maintain its shape and form as a user rides the scooter and grasps the handgrip portions 44. Normal forces include the weight of the cover and wind forces while riding, for example. Abnormal forces include forces from an object striking or being placed on the cover portion 46. Preferably, the cover portion 46 is configured to provide some wind or scratch protection to the hands of a user. In some embodiments, the outer cover 46 could be constructed to provide additional protection, such as constructing the outer cover 46 with a rigid plastic, for example.

FIGS. 6 through 11 illustrate various views of the scooter and handgrips assemblies of FIG. 1. FIGS. 12 through 19 illustrate various views of an embodiment of a set of handgrip assemblies that can be supported by a scooter or vehicle. FIGS. 20 through 23 illustrate another embodiment of a set of handgrip assemblies. FIGS. 24 through 30 illustrate various views of another embodiment of a set of handgrip assemblies. In some preferred embodiments, the handgrip assemblies include visual features such as scars, stitches, bones, wounds, warts, fingernails, or other similar features.

Although the embodiments of the invention presented herein have been disclosed in the context of certain preferred embodiments and examples, it will be understood by those skilled in the art that the invention extends beyond the specifically disclosed embodiments to other alternative embodiments and/or uses of the invention and obvious modifications and equivalents thereof. Thus, it is intended that the scope of the invention herein disclosed should not be limited by the particular embodiments described above, but should be determined only by a fair reading of the claims that follow.

What is claimed is:
1. A vehicle, comprising:
a vehicle body;
a handlebar assembly coupled to the vehicle body, the handlebar assembly comprising a right handlebar portion and a left handlebar portion;
a right handgrip assembly positioned on the right handlebar portion and a left handgrip assembly positioned on the left handlebar portion, wherein each of the right handgrip assembly and the left handgrip assembly comprises:

a handgrip portion defining an outer grip surface sized and shaped to be grasped by a user of the vehicle; and a cover portion permanently coupled and rotationally fixed to the handgrip portion, wherein the cover portion provides an appearance of an oversized hand gripping a respective one of the right handlebar portion and the left handlebar portion, the cover portion comprising:

a front wall comprising a portion facing in a forward direction, a top wall comprising a trailing edge, a bottom wall comprising:

a trailing edge that is facing in a generally rearward direction, and a thumb portion that extends below the trailing edge of the bottom wall, and;

an inner sidewall, wherein the inner sidewall extends in a radial direction from the handgrip portion and at least partially supports the cover portion relative to the handgrip portion, wherein the front wall and the top wall are spaced from the outer surface of the handgrip portion such that an entirety of the outer grip surface is accessible to the user of the vehicle, and wherein the trailing edge of the bottom wall terminates forward of a trailing edge of the handgrip portion and the trailing edge of the top wall terminates rearward of the trailing edge of the handgrip portion.

2. The vehicle of claim 1, wherein the handgrip portion and the cover portion are unitary.

3. The vehicle of claim 1, wherein the cover portion further comprises an outer sidewall and the handgrip portion comprises a hole that extends through the inner sidewall and the outer sidewall.

4. The vehicle of claim 3, wherein the top wall has a top wall length and the bottom wall has a bottom wall length, and the bottom wall length is less than one third of the top wall length.

5. The vehicle of claim 4, wherein the outer sidewall includes an edge that extends from a position adjacent the front wall and the bottom wall to a position adjacent a rear-most portion of the top wall.

6. The vehicle of claim 4, wherein the outer sidewall has a smaller surface area than the inner sidewall.

7. The vehicle of claim 4, wherein the outer sidewall, inner sidewall, bottom wall and top wall define an opening for receiving the hand of the user, the opening having a shape and the cover portion being substantially rigid.

8. The vehicle of claim 7, wherein the opening has a vertical dimension and the grip portion has a diameter, and the vertical dimension of the opening is two or three times greater than the diameter of the grip portion.

9. The vehicle of claim 1, wherein the handgrip portion includes a first end and a second end, and the first end and second end are fixedly coupled to and in contact with the cover portion.

10. The vehicle of claim 1, wherein the vehicle comprises a scooter.

11. A set of handgrip assemblies, comprising:

a right handgrip assembly and a left handgrip assembly, wherein each of the right handgrip assembly and the left handgrip assembly comprises:

a handgrip portion defining an outer grip surface sized and shaped to be grasped by a user; and a cover portion permanently coupled and rotationally fixed to the handgrip portion, wherein the cover portion provides an appearance of an oversized hand gripping a respective one of a right handlebar portion and a left handlebar portion of a vehicle handlebar on which the set of handgrip assemblies is mounted, the cover portion comprising:

a front wall comprising a portion facing in a forward direction, a top wall comprising a trailing edge, a bottom wall comprising:

a trailing edge that is facing in a generally rearward direction, and a thumb portion that extends below the trailing edge of the bottom wall, and;

an inner sidewall, wherein the inner sidewall extends in a radial direction from the handgrip portion and at least partially supports the cover portion relative to the handgrip portion, wherein the front wall and the top wall are spaced from the outer surface of the handgrip portion such that an entirety of the outer grip surface is accessible to the user of the vehicle, and wherein the trailing edge of the bottom wall terminates forward of a trailing edge of the handgrip portion and the trailing edge of the top wall terminates rearward of the trailing edge of the handgrip portion.

12. The set of handgrip assemblies of claim 11, wherein the handgrip portion and the cover portion are a single unitary piece.

13. The set of handgrip assemblies of claim 11, wherein the cover portion further comprises an outer sidewall and the handgrip portion comprises a void that extends through the inner sidewall and the outer sidewall, the void being configured to receive a portion of the handlebar.

14. The set of handgrip assemblies of claim 13, wherein the top wall has a top wall length and the bottom wall has a bottom wall length, and the bottom wall length is less than one third of the top wall length of the top wall.

15. The set of handgrip assemblies of claim 14, wherein the outer sidewall includes an edge that extends from a position adjacent the front wall and the bottom wall to a position adjacent the rear-most portion of the top wall.

16. The set of handgrip assemblies of claim 14, wherein the outer sidewall has a smaller surface area than the inner sidewall.

17. The set of handgrip assemblies of claim 14, wherein the outer sidewall, inner sidewall, bottom wall and top wall define an opening for receiving the hand of the user, the opening having a permanent shape and the cover portion being rigid enough to maintain the shape of the opening.

18. The set of handgrip assemblies of claim 17, wherein the opening has a vertical dimension and the grip portion has a diameter, and the vertical dimension of the opening is more than two times greater than the diameter of the grip portion.

19. The set of handgrip assemblies of claim 11, wherein the handgrip portion includes a first end and a second end, and the first end and second end are in direct contact with the cover portion.

20. A vehicle, comprising:

a vehicle body;

a handlebar assembly coupled to the vehicle body, the handlebar assembly comprising a right handlebar portion and a left handlebar portion;

a right handgrip assembly positioned on the right handlebar portion and a left handgrip assembly positioned on the left handlebar portion, wherein each of the right handgrip assembly and the left handgrip assembly comprises:
  a handgrip portion having a leading edge and a trailing edge and defining an outer grip surface sized and shaped to be grasped by a user of the vehicle; and
  a cover portion permanently coupled and rotationally fixed to the handgrip portion, the cover portion comprising:
    a front wall,
    a top wall,
    a bottom wall, and
    an inner sidewall, wherein the inner sidewall extends in a radial direction from the handgrip portion and at least partially supports the cover portion relative to the handgrip portion,
  wherein the handgrip portion and the cover portion are unitary and the cover portion provides an appearance of an oversized hand gripping a respective one of the right handlebar portion and the left handlebar portion,
  wherein the bottom wall comprises a first fingertip, a second fingertip, and a thumb, wherein at least a portion of the thumb is positioned below the first fingertip and the second fingertip,
  wherein the front wall and the top wall are spaced from the outer surface of the handgrip portion such that an entirety of the outer grip surface is accessible to the user of the vehicle, and
  wherein, when viewed from below, a trailing edge of the first fingertip is substantially aligned with the leading edge of the handgrip portion.

21. The vehicle of claim 20, wherein a trailing edge of the second fingertip is substantially aligned with the leading edge of the handgrip portion.

22. The vehicle of claim 20, wherein the bottom wall further comprises a third fingertip, and wherein a trailing edge of the third fingertip is substantially aligned with the leading edge of the handgrip portion.

23. The vehicle of claim 20, wherein the top wall comprises a trailing edge and the bottom wall further comprises a trailing edge that is rearward facing, wherein the trailing edge of the bottom wall terminates forward of the trailing edge of the handgrip portion, and wherein the trailing edge of the top wall terminates rearward of the trailing edge of the handgrip portion.

24. The vehicle of claim 20, wherein the vehicle comprises a scooter.

25. A set of handgrip assemblies, comprising:
a right handgrip assembly and a left handgrip assembly, wherein each of the right handgrip assembly and the left handgrip assembly comprises:
  a handgrip portion having a leading edge and a trailing edge and defining an outer grip surface sized and shaped to be grasped by a user; and
  a cover portion permanently coupled and rotationally fixed to the handgrip portion, the cover portion comprising:
    a front wall,
    a top wall,
    a bottom wall, and
    an inner sidewall, wherein the inner sidewall extends in a radial direction from the handgrip portion and at least partially supports the cover portion relative to the handgrip portion,
  wherein the handgrip portion and the cover portion are unitary and the cover portion provides an appearance of an oversized hand gripping a respective one of the right handlebar portion and the left handlebar portion of a vehicle handlebar on which the set of hand grip assemblies is mounted,
  wherein the bottom wall comprises a first fingertip, a second fingertip, and a thumb, wherein at least a portion of the thumb is positioned below the first fingertip and the second fingertip,
  wherein the front wall and the top wall are spaced from the outer grip surface of the handgrip portion such that an entirety of the outer grip surface is accessible to the user of the vehicle; and
    wherein, when viewed from below, a trailing edge of the first fingertip is substantially aligned with the leading edge of the handgrip portion.

26. The set of handgrip assemblies of claim 25, wherein a trailing edge of the second fingertip is substantially aligned with the leading edge of the handgrip portion.

27. The set of handgrip assemblies of claim 25, wherein the bottom wall further comprises a third fingertip, and wherein a trailing edge of the third fingertip is substantially aligned with the leading edge of the handgrip portion.

28. The set of handgrip assemblies of claim 25, wherein the top wall comprises a trailing edge and the bottom wall further comprises a trailing edge that is rearward facing, wherein the trailing edge of the bottom wall terminates forward of the trailing edge of the handgrip portion, and wherein the trailing edge of the top wall terminates rearward of the trailing edge of the handgrip portion.

* * * * *